(12) United States Patent
Toit

(10) Patent No.: US 7,013,931 B2
(45) Date of Patent: Mar. 21, 2006

(54) DEVICE FOR INFLATING VEHICLE TIRES

(75) Inventor: Pierre Du Toit, Tokai (ZA)

(73) Assignee: Pressurite (PTY) Ltd., Newlands (ZA)

( * ) Notice: Subject to any disclaimer, the term of this patent is extended or adjusted under 35 U.S.C. 154(b) by 0 days.

(21) Appl. No.: 10/479,221

(22) PCT Filed: May 31, 2002

(86) PCT No.: PCT/ZA02/00094

§ 371 (c)(1),
(2), (4) Date: May 24, 2004

(87) PCT Pub. No.: WO03/000510

PCT Pub. Date: Jan. 3, 2003

(65) Prior Publication Data

US 2004/0194845 A1    Oct. 7, 2004

(30) Foreign Application Priority Data

May 31, 2001  (ZA) ................................. 2001/3788
Nov. 1, 2001  (ZA) ................................. 2001/9028

(51) Int. Cl.
*B65B 1/04* (2006.01)
(52) U.S. Cl. .......................... 141/38; 417/233; 152/418
(58) Field of Classification Search .................. 141/38; 417/233; 152/418, 420
See application file for complete search history.

(56) References Cited

U.S. PATENT DOCUMENTS

| | | | | |
|---|---|---|---|---|
| 1,571,072 A | * | 1/1926 | Talbert | ........................ 152/420 |
| 1,744,405 A | * | 1/1930 | McCord | ....................... 152/418 |
| 5,947,696 A | * | 9/1999 | Baumgarten | ................ 417/233 |

FOREIGN PATENT DOCUMENTS

FR           761 011 A       3/1934

* cited by examiner

Primary Examiner—Steven O. Douglas
(74) Attorney, Agent, or Firm—Stites & Harbison; Douglas E. Jackson

(57) ABSTRACT

A device is disclosed for pumping the tire of a vehicle while the vehicle is travelling. The device is mounted on the wheel axle and, apart from a hanging counterweight (226) which remains stationary, the entire device rotates with the axle and wheels. Tire pressure is sensed and, when below a predetermined level, a piston (22) moves axially to press a rotating clutch plate (260) against the stationary counterweight (226). The clutch plate (260) thus stops rotating. Part of a pump drive structure (216) stops rotating with the clutch plate (260). Relative rotation between this part of the pump drive structure and the remainder of the pump drive structure causes air to be pumped to the tire. When tire pressure has been restored the piston (22) moves back, the clutch plate (260) is released, and the pumping action ceases.

7 Claims, 18 Drawing Sheets

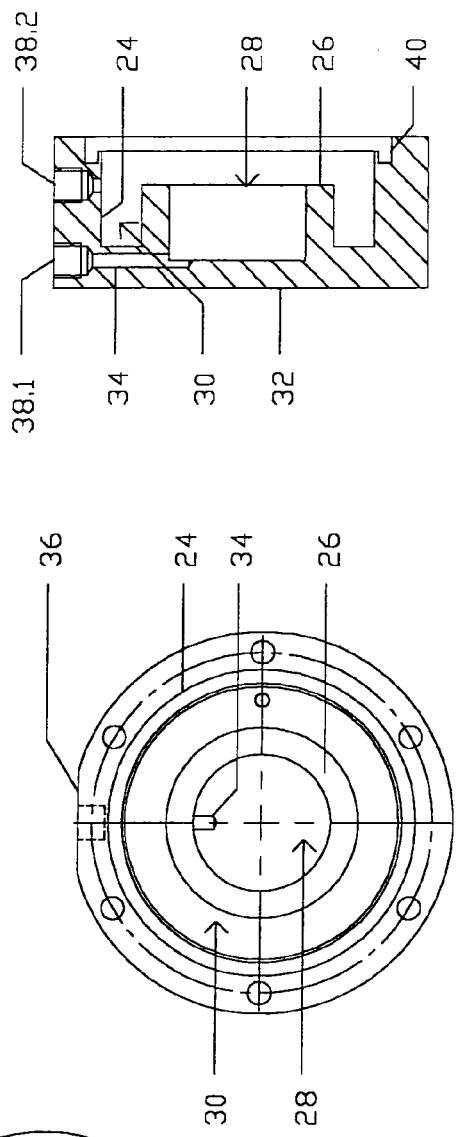
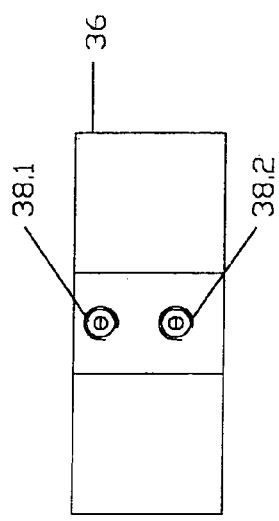
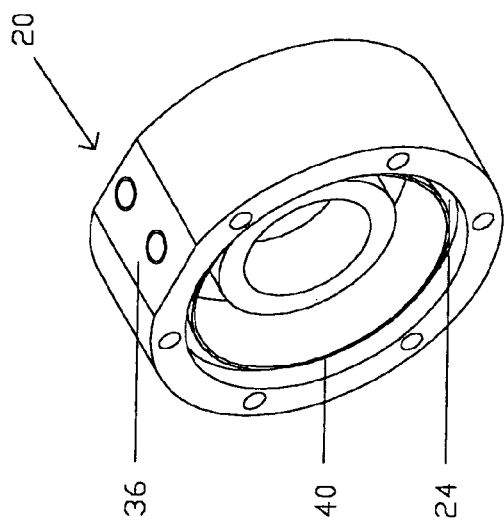

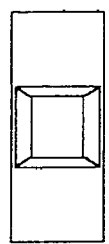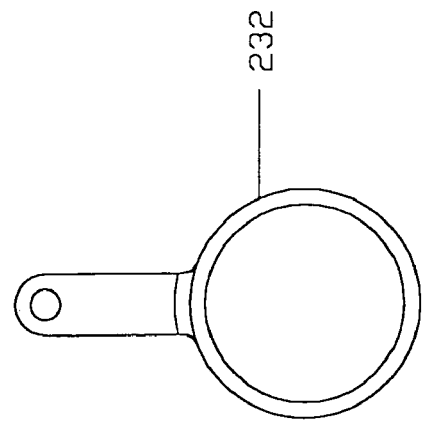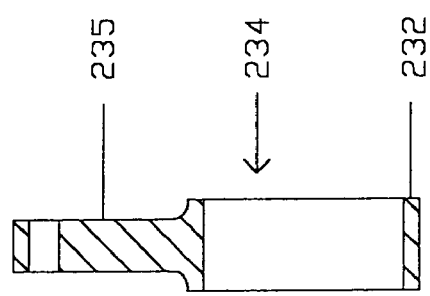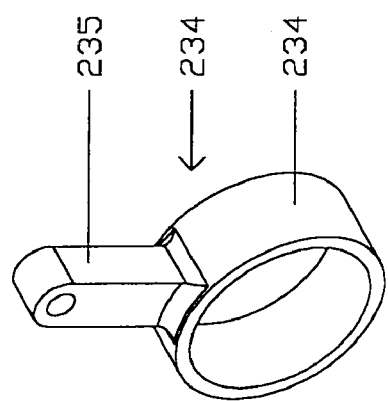

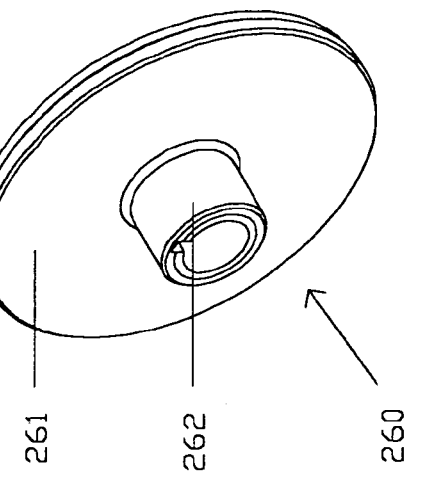
FIG. 27
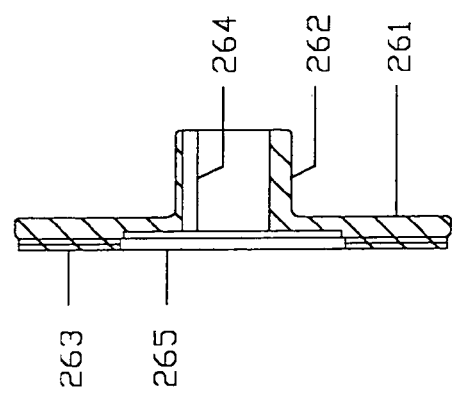
FIG. 26
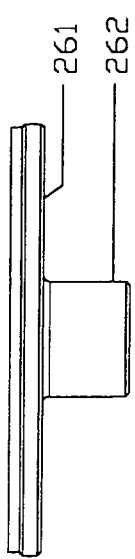
FIG. 24
FIG. 25

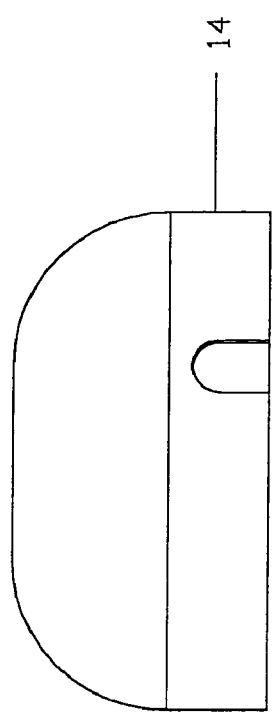
FIG. 31A
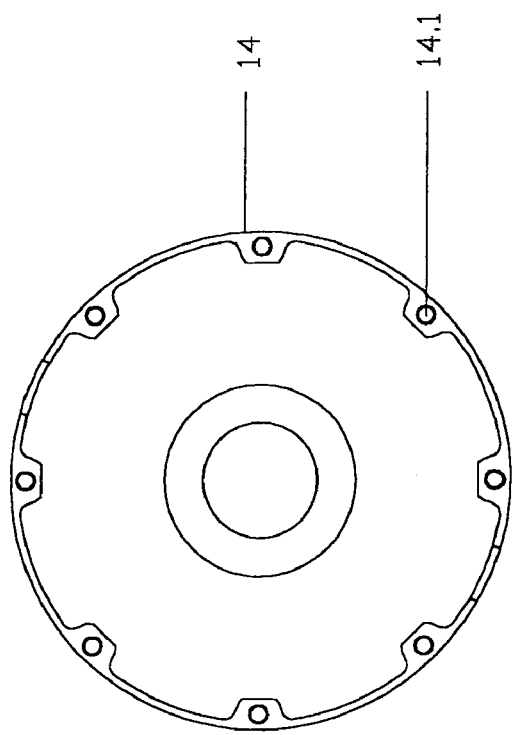
FIG. 31B
FIG. 32

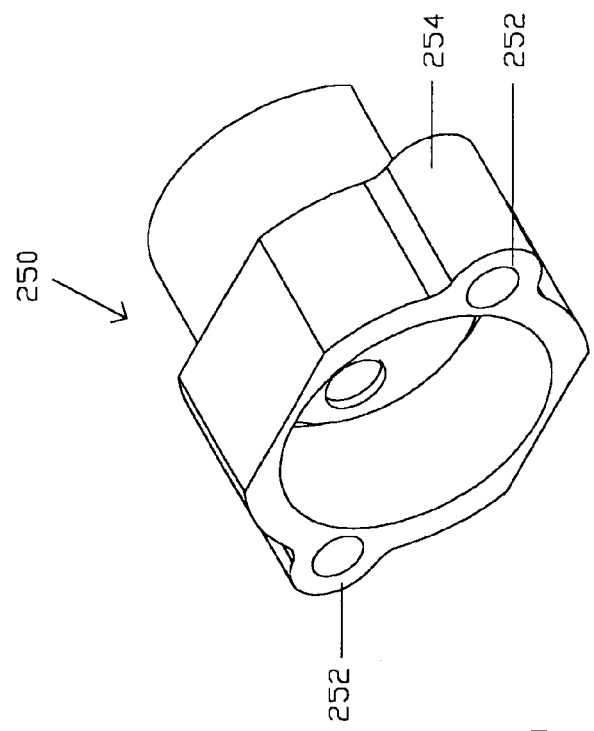
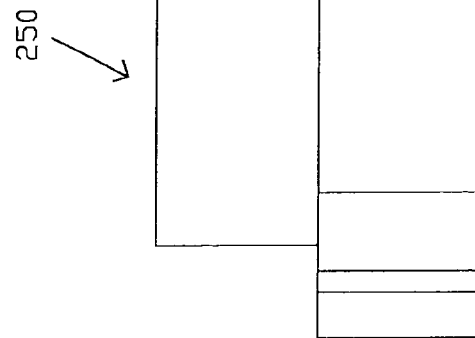
FIG. 39
FIG. 38
FIG. 37

DEVICE FOR INFLATING VEHICLE TIRES

FIELD OF THE INVENTION

THIS INVENTION relates to a device for inflating vehicle tyres to maintain them at the correct operating pressure.

BACKGROUND TO THE INVENTION

Tyres are designed to be run at the pressures the manufacturers specify thereby to achieve the longest life. Significant deviation from the specified pressure, whether above or below the specified pressure, causes excessive tyre wear. The actual pressure used depends to some extent on the load on the tyre.

It is well known that the pressure in a tyre varies with temperature. A tyre which is at optimum pressure when cold can be over optimum pressure when hot.

The present invention seeks to provide a device for controlling tyre pressure so that it remains at correct operating pressure.

BRIEF DESCRIPTION OF THE INVENTION

According to one aspect of the present invention there is provided a device for inflating a vehicle tyre which device comprises a pump which in use rotates with the vehicle tyre, and a pump drive system for activating said pump upon a loss of tyre pressure being detected thereby to pump air to the tyre, characterized in that said pump drive system comprises a first part which rotates continuously with said pump and a second part which rotates with the pump and said first part whilst the pressure in the tyre is above a predetermined level, said second part being inhibited from rotating with said first part whilst the tyre pressure is below said predetermined level, relative rotation between said first and second parts driving said pump to pump air to the tyre.

In a preferred form said device includes a piston in a housing, the piston and housing bounding two chambers for connection to the tyre to be pumped, the chambers being on opposite sides of the piston whereby the piston is subjected on two faces thereof to tyre pressure, one face being larger in area than the other, there being means for evacuating the chamber which is bounded by said one face upon tyre pressure dropping thereby permitting the piston to move under pressure in the other chamber, movement of the piston inhibiting rotation of said second part.

The device can further include a clutch plate which rotates with said second part and a counterweight which does not rotate, said clutch plate being urged against said counterweight when the piston moves upon said one chamber being evacuated thereby to stop rotation of said clutch plate, said clutch plate being fast in rotation with said second part.

In one constructional form said second part is a shaft which includes an eccentric and said first part comprises a connecting rod and a plunger, the eccentric reciprocating said rod which in turn reciprocates the plunger in a cylinder to pump air upon rotation of said eccentric being inhibited.

In another constructional form the device includes a sun gear which is fast in rotation with said clutch plate, a planetary gear in mesh with said sun gear, a pump including a cylinder and a plunger, and a crank driven by said planetary gear for reciprocating said plunger in the cylinder when said clutch plate is urged against the counterweight.

According to a further aspect of the present invention there is provided a device for inflating a vehicle tyre whilst the vehicle is travelling, the device comprising an element having a first position which it occupies when the tyre pressure is at or above a predetermined level and a second position it occupies when the tyre pressure is below said level, means for detecting that tyre pressure is below said level and initiating movement of said element to said second position, a pump for pumping said tyre, the pump, in use, rotating with the vehicle tyre, a pump drive system having first, second and third parts, said first part being a non-rotating part, said second part, in use, rotating continuously and the third part rotating with the second part whilst the tyre pressure is above said level, said element urging said third part into cooperating relationship with said first part so that the third part stops rotating upon said element moving to its second condition, consequent relative rotation between said second and third parts causing air to be pumped.

In a preferred construction said first part is a counterweight the mass of which inhibits it from rotating, said second part is a planetary gear wheel, and said third part includes a sun wheel about which the planetary gear rolls when the sun wheel is prevented from rotating and a clutch plate which is urged into contact with said counterweight upon said element moving to said second position.

BRIEF DESCRIPTION OF THE DRAWINGS

For a better understanding of the present invention, and to show how the same may be carried into effect, reference will now be made, by way of example, to the accompanying drawings in which:

FIG. 5 is a pictorial view of a differential housing;

FIG. 6 is an axial elevation of the housing;

FIG. 7 is a section through the housing;

FIG. 8 is a top plan view of the housing;

FIGS. 12 to 15 are three views and a section of a connecting rod;

FIGS. 24 to 27 are three views and a section illustrating a clutch plate;

FIGS. 31a, 31b and 32 are three views of a main cover;

FIGS. 37 to 39 are three views of a cylinder head;

DETAILED DESCRIPTION OF THE DRAWINGS

Figure 1:
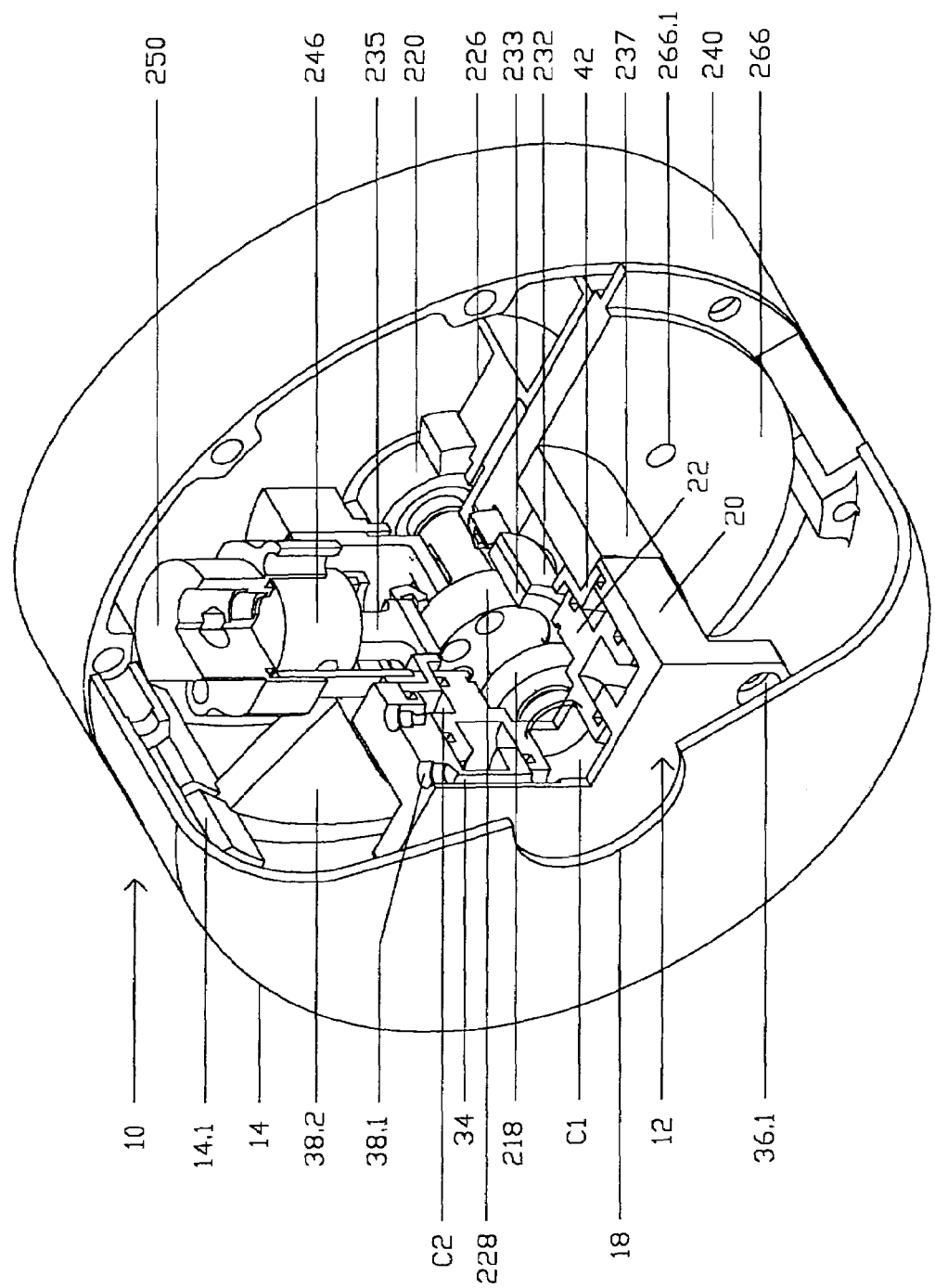
FIG. 1 is a cutaway view illustrating a device for inflating vehicle tyres.

The device 10 illustrated in FIG. 1 is intended to be fitted to the hub which carries a pair of side-by-side tyres such as are found on heavy goods vehicles and buses. The device 10 comprises a pump and clutch structure 12 which is within a protective cover 14 see FIGS. 31a, 31b and 32. The cover 14 has an opening 18 therein which forms the air inlet and which receives a filter cartridge (not shown).

Figure 3:
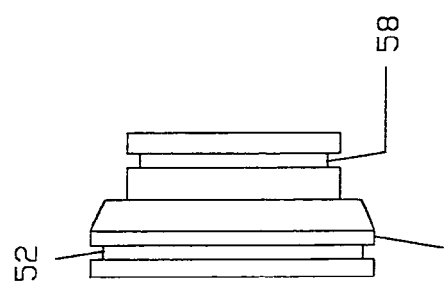
FIG. 3 is a side elevation of the piston.
Figure 4:
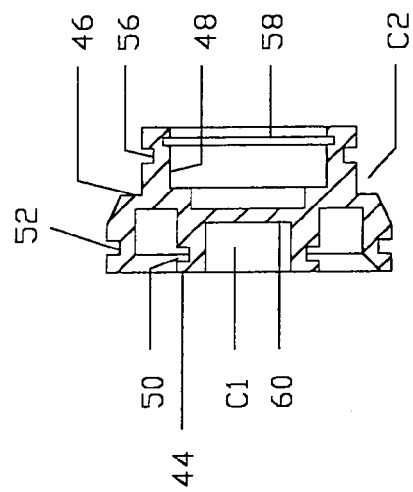
FIG. 4 is a section through the piston.
Figure 2:
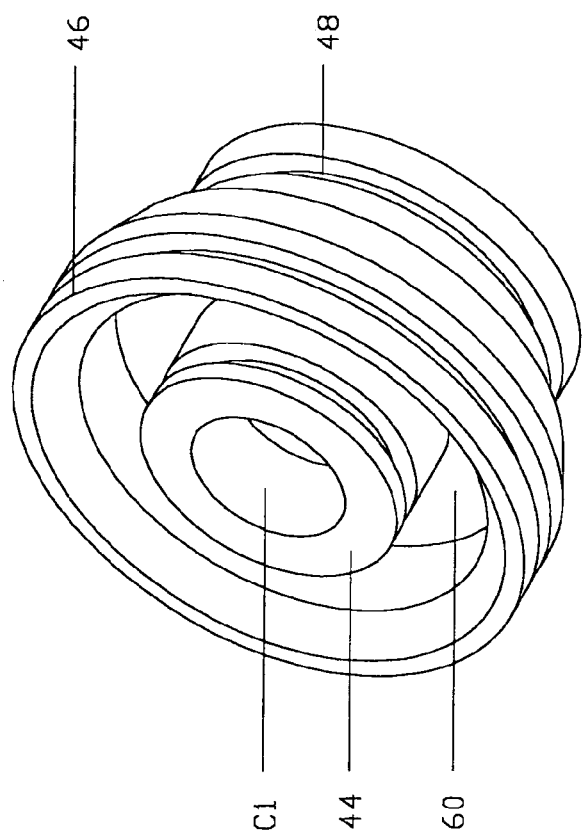
FIG. 2 is a pictorial view of a differential force piston.

Reference numeral 20 designates a housing (see FIGS. 5 to 8) which receives a differential piston 22 (see FIGS. 2 to 4). The housing 20 includes an outer sleeve 24 and a co-axial inner sleeve 26 which provide cylinders 28 and 30 of different diameters. An end wall 32 forming part of the housing 20 closes off one end of the larger diameter cylinder 30. There is a radially extending passage 34 in the end wall 32, the passage 34 leading from externally of the housing 20 to the smaller diameter cylinder 28.

Externally the housing 20 is generally octagonal and has a flange 36 at one end. Two tapped bores 38.1, 38.2 are formed in one of the flats. These lead into the passage 34 and into the cylinder 30.

A groove 40 which encircles the outer sleeve 24 serves to receive a cover 42 (see FIGS. 20 to 23). A seal (not shown) is interposed between the cover 42 and the housing 20.

The differential piston 22 (FIGS. 2 to 4) comprises a smaller diameter section 44, a larger diameter section 46 and an intermediate diameter section 48. The smaller diameter section 44 slides in the sleeve 28. A seal (not shown) in a groove 50 encircling the section 44 seals between the piston 22 and the sleeve 28.

A partition wall 60 separates the piston 22 into a chamber C1 on one side of the wall 60 and a chamber C2 on the other side of the wall. The chamber C1 is permanently subjected to tyre pressure via the passage 34 and bore 38.1. The chamber C2 is subjected, via the bore 38.2, to tyre pressure whilst the tyres are inflated to the desired pressure. A drop in tyre pressure causes the chamber C2 to be evacuated.

The larger diameter section 46 carries, in a groove 52, a sealing ring which seals between it and the sleeve 24. The intermediate diameter section 48 slides in the bore 54 (see FIGS. 20 to 23) of the cover 42. A seal in a groove 56 of the section 48 seals between it and the cover 42. The intermediate diameter section 48 includes a further groove 58 which receives a bearing retaining clip (not shown).

Figure 9:
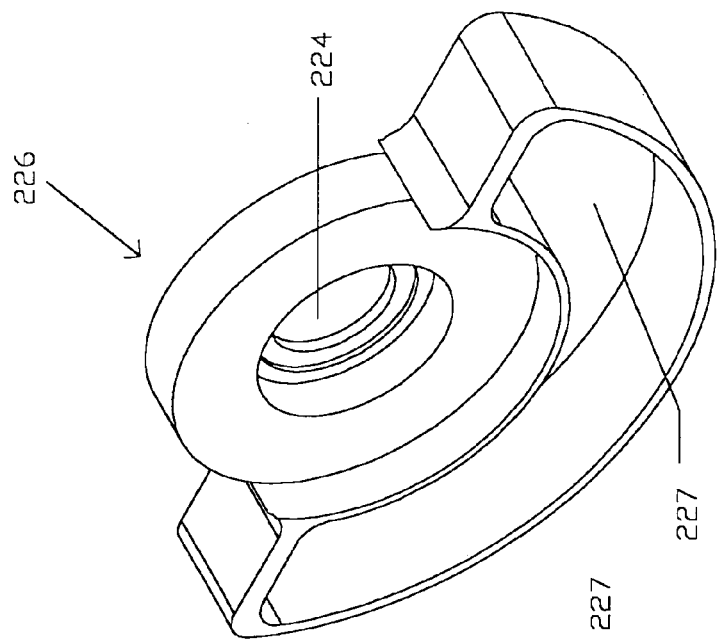
FIGS. 9 to 11 are two views of a counterweight and a section through the counterweight.
Figure 11:
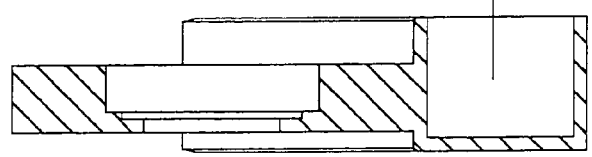
Figure 10:
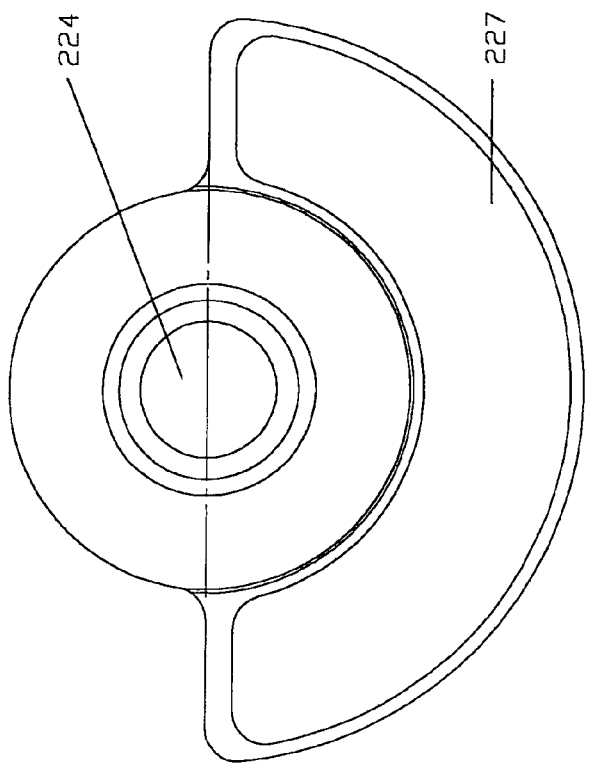
Figure 18:
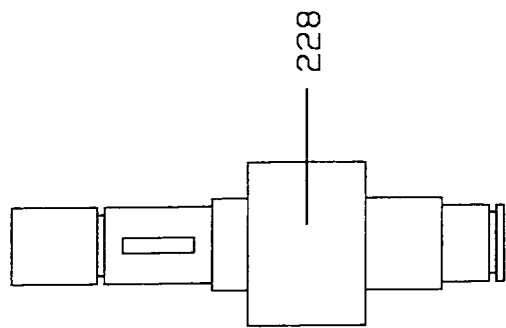
FIGS. 16 to 19 are four views of an eccentric shaft.
Figure 19:
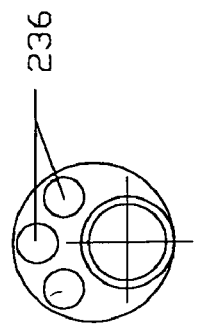
Figure 16:
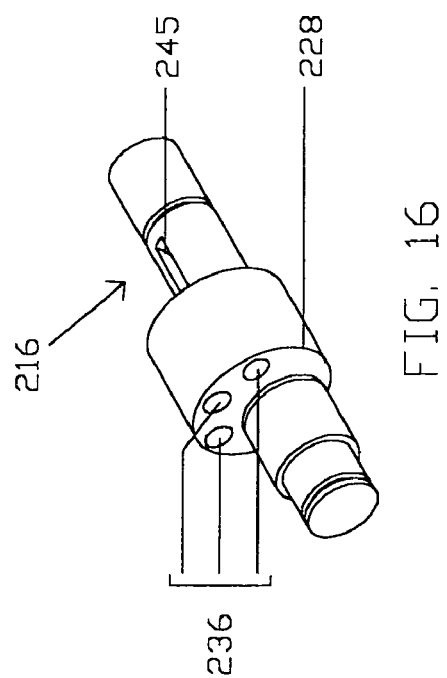
Figure 17:
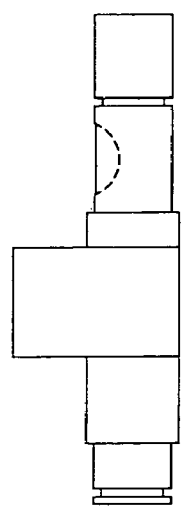
Figure 22:
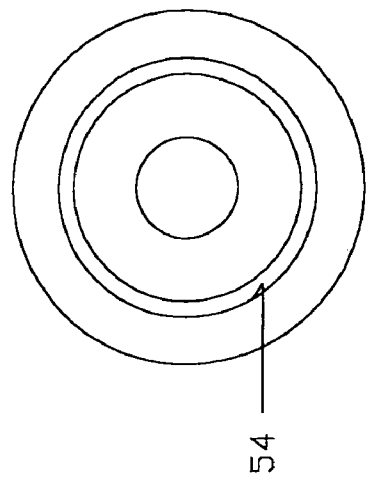
FIGS. 20 to 23 are four views of a differential cylinder cover.
Figure 23:
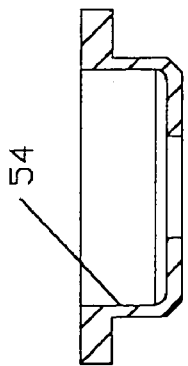
Figure 21:
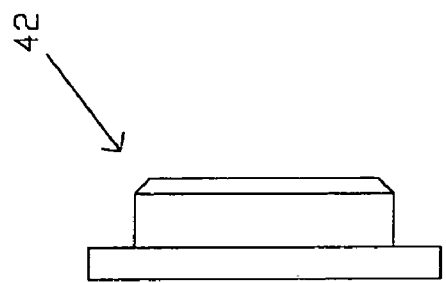
Figure 20:
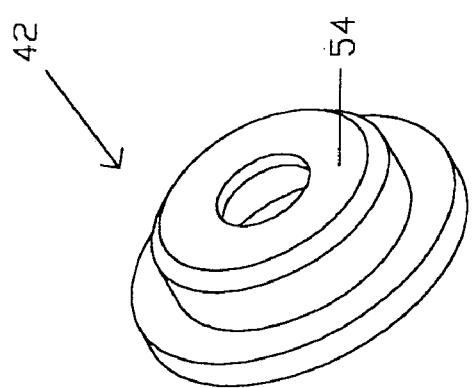

A shaft 216 (see FIGS. 16 to 19) is carried by two bearings 218 and 220. The bearing 218 is within the intermediate diameter section 48 of the piston 22 and the bearing 220 is in a bore 224 provided in a counterweight 226 (see FIGS. 9 to 11).

The clip in the groove 58 retains the bearing 218 in place.

The shaft 216 includes an eccentric 228 which fits into the ring 232 of a connecting rod structure 234 (FIGS. 12 to 15). The eccentric 228, when it rotates relatively to the ring 232, displaces the rod 235 of the structure 234 radially in a pumping action. Between the eccentric 228 and the ring 232 there is a needle roller bearing which is diagrammatically shown at 233 in FIG. 1. The ring 232 is mounted in a housing 237 (see FIGS. 33 to 36). The housing 237 is generally cylindrical and has a radial opening at 239 for the rod 235, an air intake opening at 243 and two tapped bores 241.

A keyway 245 is provided in the shaft 216. The shaft 216 has holes 236 in the eccentric portion thereof to reduce the off-balance effect.

Figure 29:
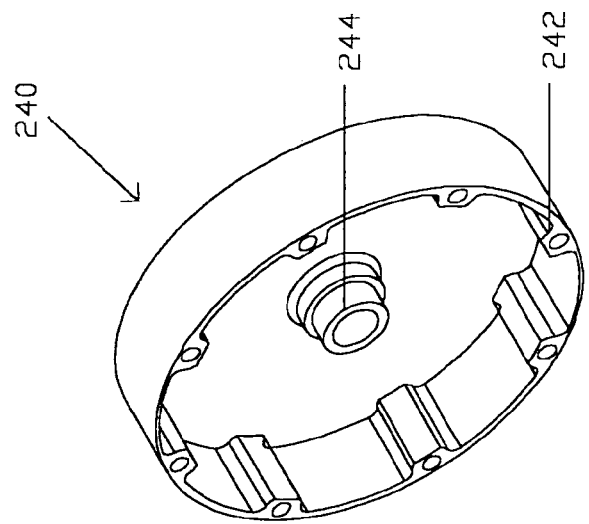
FIGS. 28 to 30 are two views and a section illustrating a counterweight housing.
Figure 30:
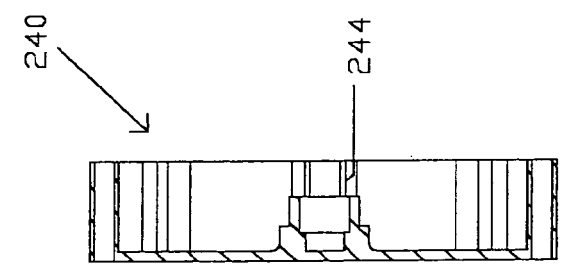
Figure 28:
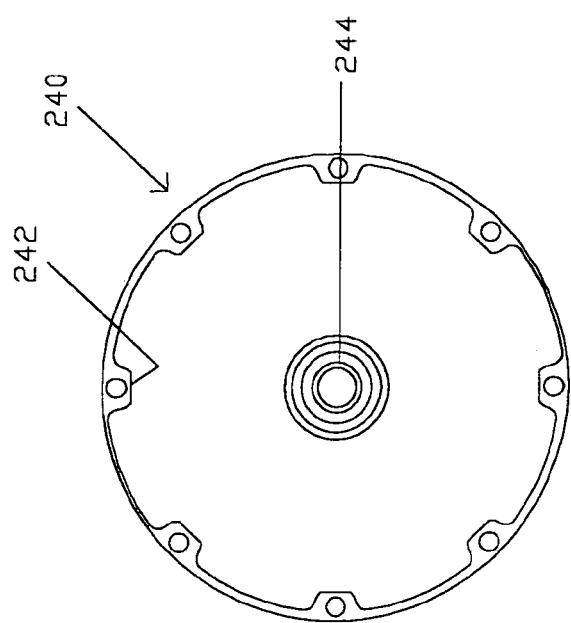
Figure 35:
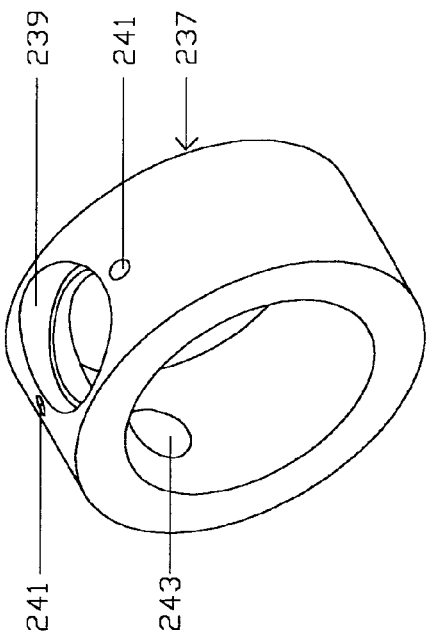
FIGS. 33 to 36 are three views and a section illustrating a cylinder housing.
Figure 36:
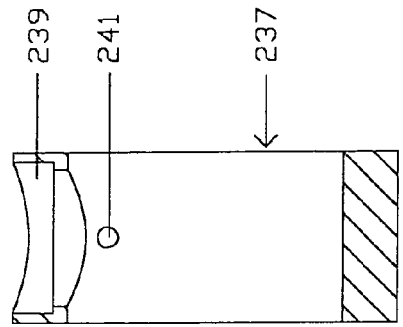
Figure 33:
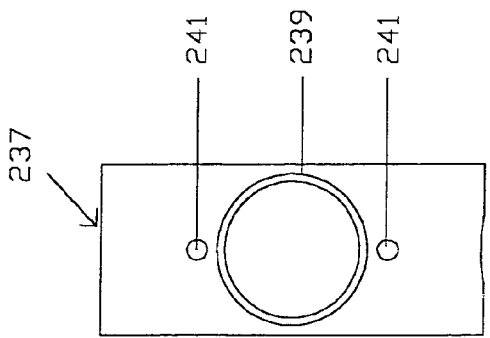
Figure 34:
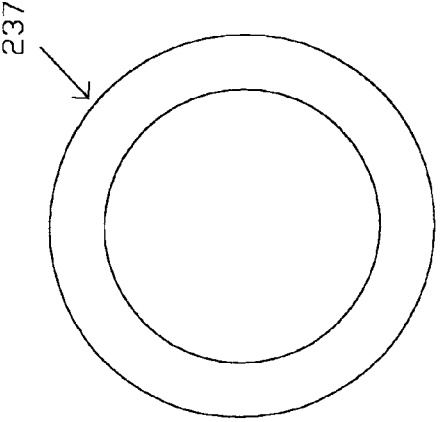
Figure 42:
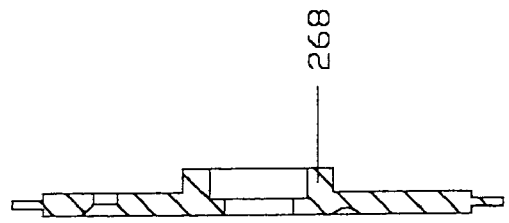
FIGS. 40 to 42 are two views and a section illustrating a mounting plate.
Figure 41:
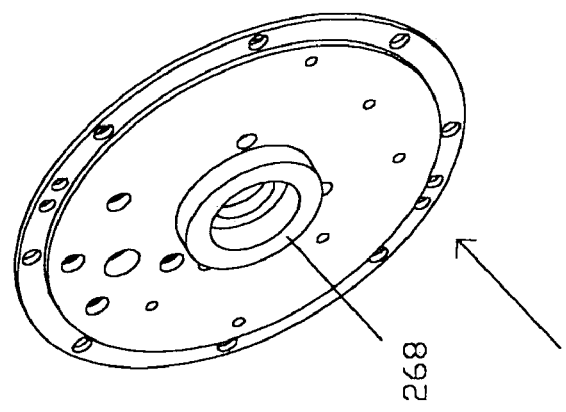
Figure 40:
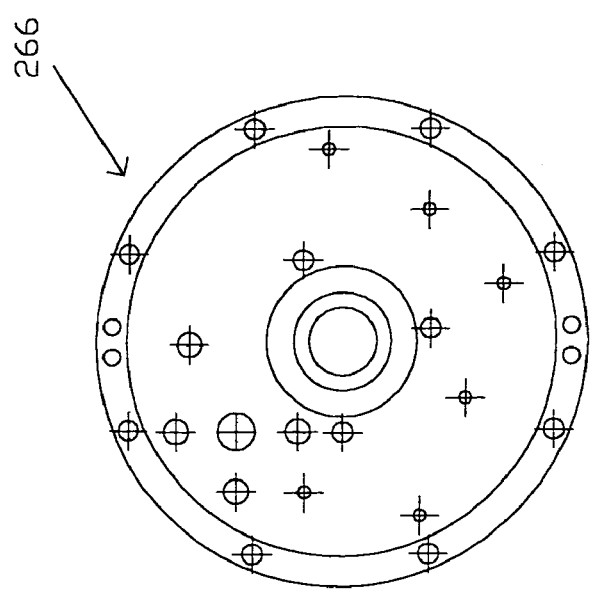

The counterweight 226 is within a housing 240 (FIGS. 28 to 30) which is secured by bolts to the cover 14 (FIGS. 31a, 31b and 32). The cover 14 includes internal bosses 14.1 with tapped bores which receive the bolts and the housing 240 has similar bosses 242 which have plain bores therein. A mounting plate 266 (FIGS. 40 to 41) is interposed between the cover 14 and the housing 240. The mounting plate 266 has a central sleeve 268. Bolts (not shown) passed through the holes 36.1 in the flange 36 and into tapped bores 266.1 in the back plate 266 secure the housing 20 in place.

The counterweight 226 does not rotate but all the other components turn with the wheel and hub. The outer race of the bearing 220 is secured to the counterweight 226, and the mass of the counterweight stops the outer race from rotating. The counterweight has an arcuate recess 227 which is lead filled to increase the mass of the counterweight.

The end of the shaft 216 remote from the piston 22 runs in a bearing in the sleeve 244 of the housing 240.

The rod 235 has, at the end thereof remote from the ring 232, a transverse bore which connects it to a plunger 246 (FIG. 1). The plunger 246 is within a cylinder 248 (only shown in FIG. 1). The cylinder is generally cylindrical and has a flange at its lower end with two plain bores in the flange. These bores align with the tapped bores 241 in the housing 237. A cylinder head 250 (FIGS. 37 to 39) is fitted to the upper end of the cylinder 248. The cylinder head 250 has plain bores 252 in a flange 254 thereof. Bolts passed through the bores 252, through the plain bores in the flange of the cylinder and screwed into the tapped bores 241 secure the cylinder to the housing 237.

Between the mounting plate 266 and the counterweight 226 there is a clutch plate 260 (see FIGS. 24 to 27). The clutch plate 260 comprises a hub 262 with an internal keyway 264 and a disc 261 having friction material 263 on the face thereof. There is a circular recess 265 in the face of the disc 261, the friction material 263 encircling this recess.

A key is fitted in the keyways 245 and 264 of the shaft 216 and clutch plate 260 so that these rotate as a unit.

The clutch plate 260 is provided for connecting the shaft 216 and its integral eccentric 228 to the non-rotating counterweight 226 when the force exerted by the air in the chamber C1 forces the piston 22 to the right, as shown in FIG. 1, upon the chamber C2 being evacuated.

Within the cylinder head 250 there is a valve structure (not shown) including seats, valve closure elements and springs which permit air to flow in when the plunger 246 is moving away from the head 250 and to flow out, on a certain pressure being attained, when the plunger 246 is moving in its compression stroke towards the cylinder head 250. The air inlet is through the plunger itself, air reaching the underside of the piston via the intake opening 243.

Figure 43:
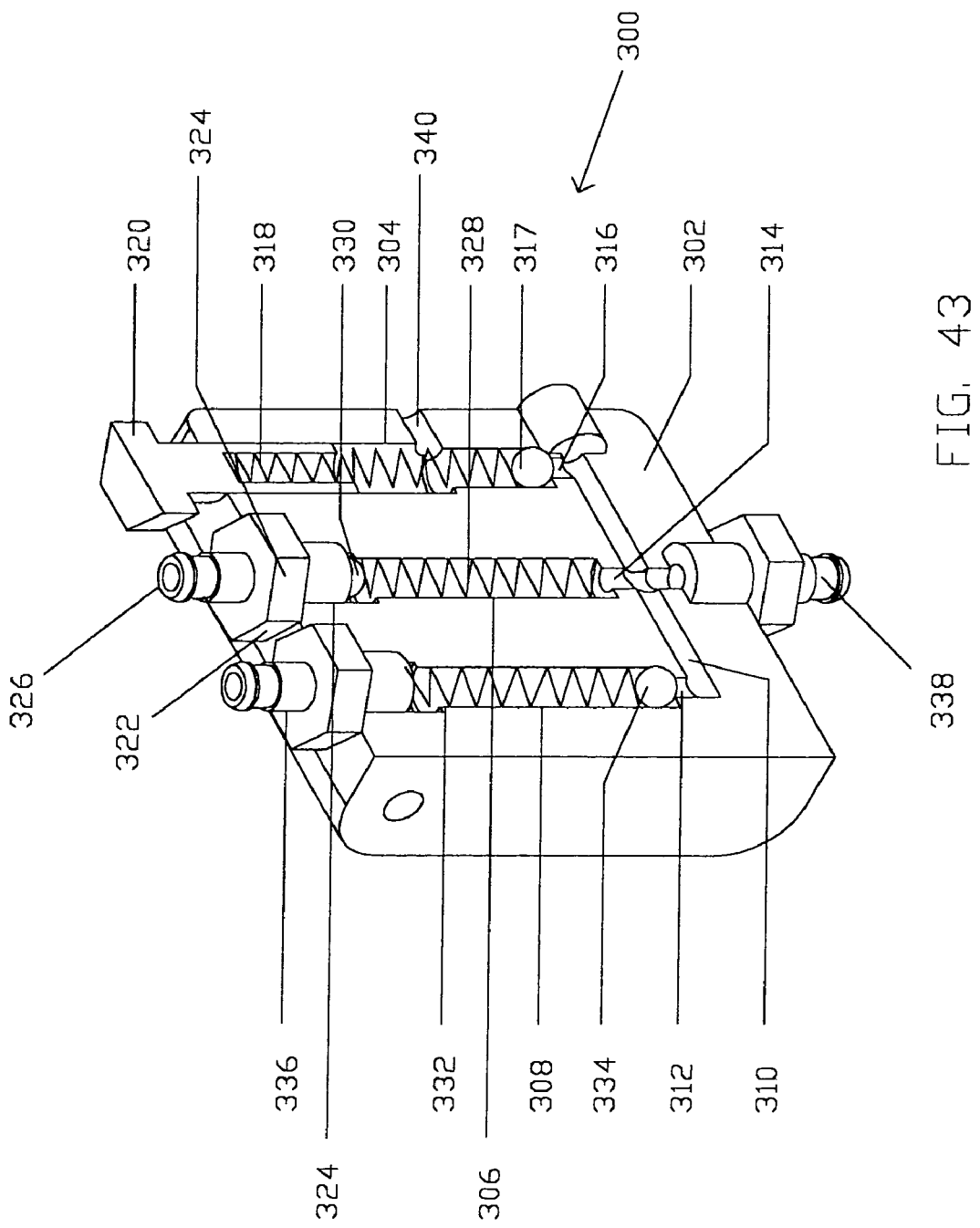
FIG. 43 is a cut away pictorial view of a distribution unit.

The distribution unit 300 shown in FIG. 43 comprises a block 302 having therein a number of passages and bores. Three bores are designated 304, 306 and 308 and a manifold passage is designated 310. Short passages 312, 314 and 316 of smaller diameter than the bores 304, 306 and 308 connect the bores to the manifold passage 310.

The bore designated 304 has therein a sealing ball 317 which seats on the end of the bore 304 and is pressed against its seat by a spring 318. The other end of the bore 304 is closed by a spring tension adjustment device 320.

A seat 322 is inserted into the end of the bore 306 remote from the passage 314. The seat has a passageway 324 in it and a nipple 326 connects the passageway 324 to a hose (not shown) which leads to the source of air under pressure available in the cylinder head 250.

A spring 328 in the bore 306 presses a sealing ball 330 against the end of the passageway 324.

The bore 308 has a spring 332 and a ball 334 therein. A connector nipple 336 is provided at the other end of the bore 308 and this permanently connects the bore 308, and hence the tyres, to the chamber C1.

A pressure relief passage 340 connects the bore 304 to atmosphere.

A further connector nipple 338 is provided to place the manifold passage 310 in communication with the tyre in a single tyre configuration or with one of the tyres in a dual-wheel configuration. In this latter construction two distributor units 300 are required.

Figure 44:
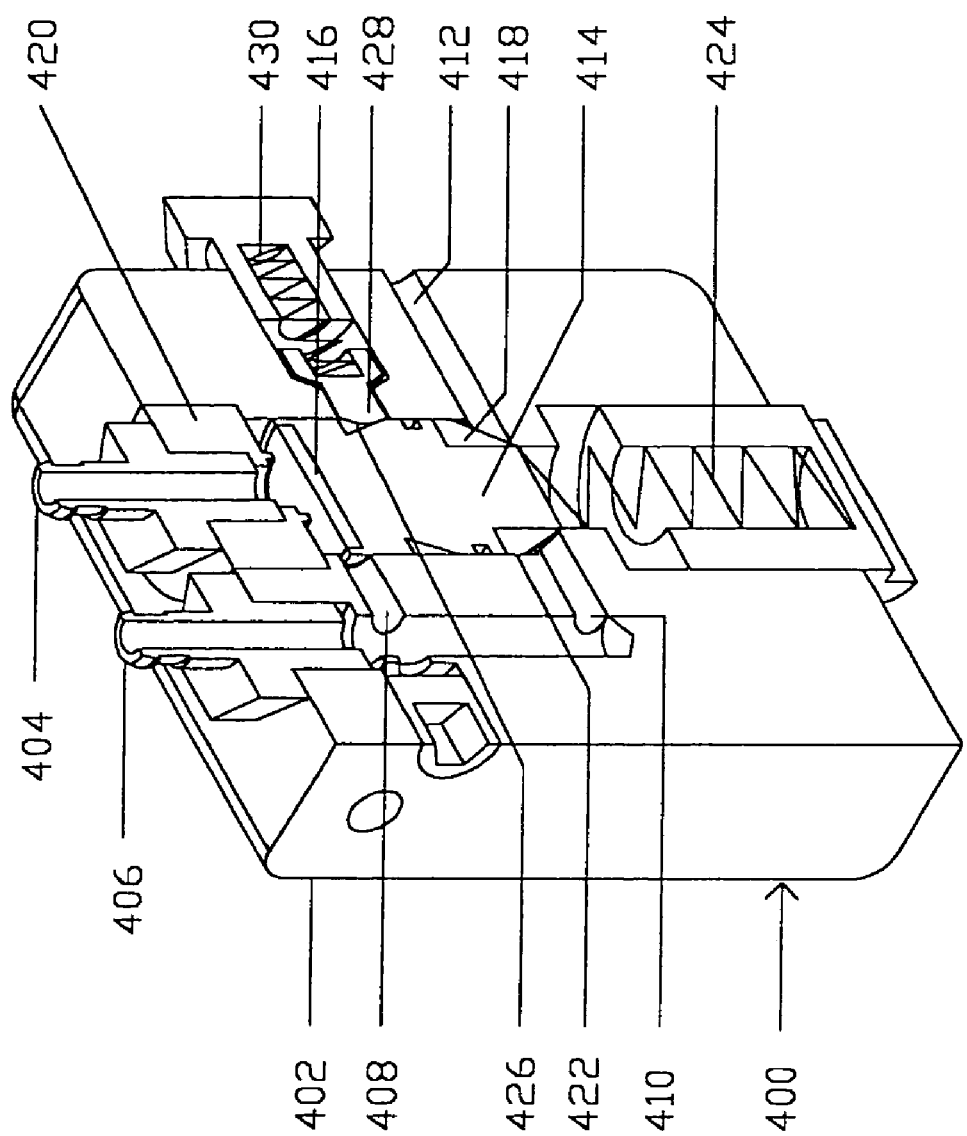
FIG. 44 is a cut away pictorial view of a pressure sensor.

Turning now to FIG. 44, this diagrammatically illustrates a pressure sensor 400. The sensor comprises a block 402 which has an inlet 404 which is for connection to a tyre so that tyre pressure is constantly applied to the inlet 404. This connection is via the nipples 338 and 326 of the distributor unit 330. A second inlet 406 connects to the chamber C2. Within the block 402 the inlet splits into a first branch 408 and a second branch 410. An air exhaust passage 412 communicates, in a specific condition, with the branch 410 and the inlet 404 communicates, in another condition, with the branch 408.

A piston 414 carries a first seal 416 of disc-like form and a second seal 418 of conical form. The seal 416 co-operates with a seat 420 and the seal 418 co-operates with a seat 422.

A spring 424 urges the piston's seal 416 against the seat 420.

A groove 426 in the surface of the piston has a pawl 428 urged into it by a spring 430. The pawl 428 acts as a latch, it being necessary for the force of the spring 424 to move the pawl 428 out of the groove 426 against the action of the spring 430 before the piston 414 can move.

Figure 45:
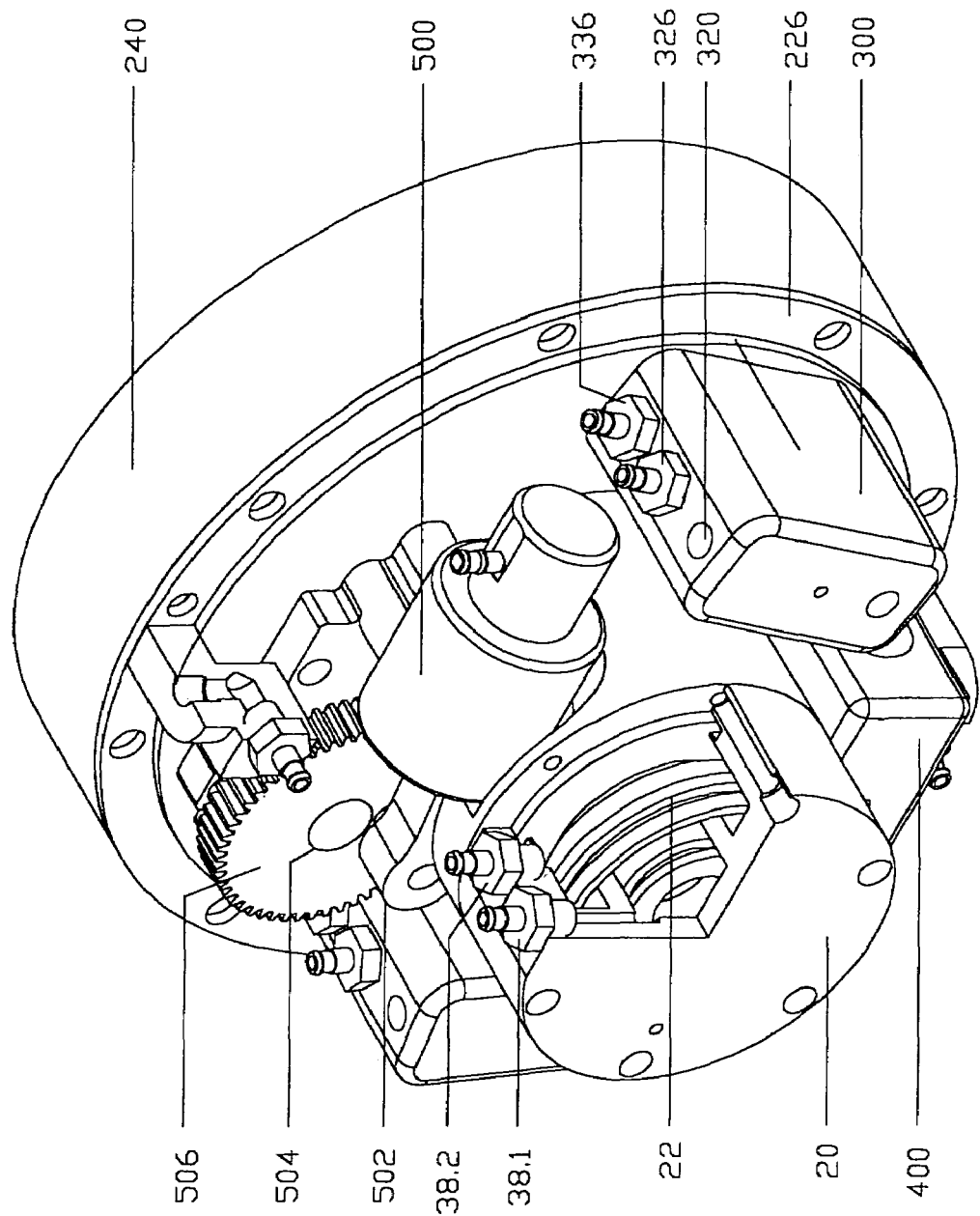
FIG. 45 is a pictorial view of a further embodiment of tyre pumping device.
Figure 46:
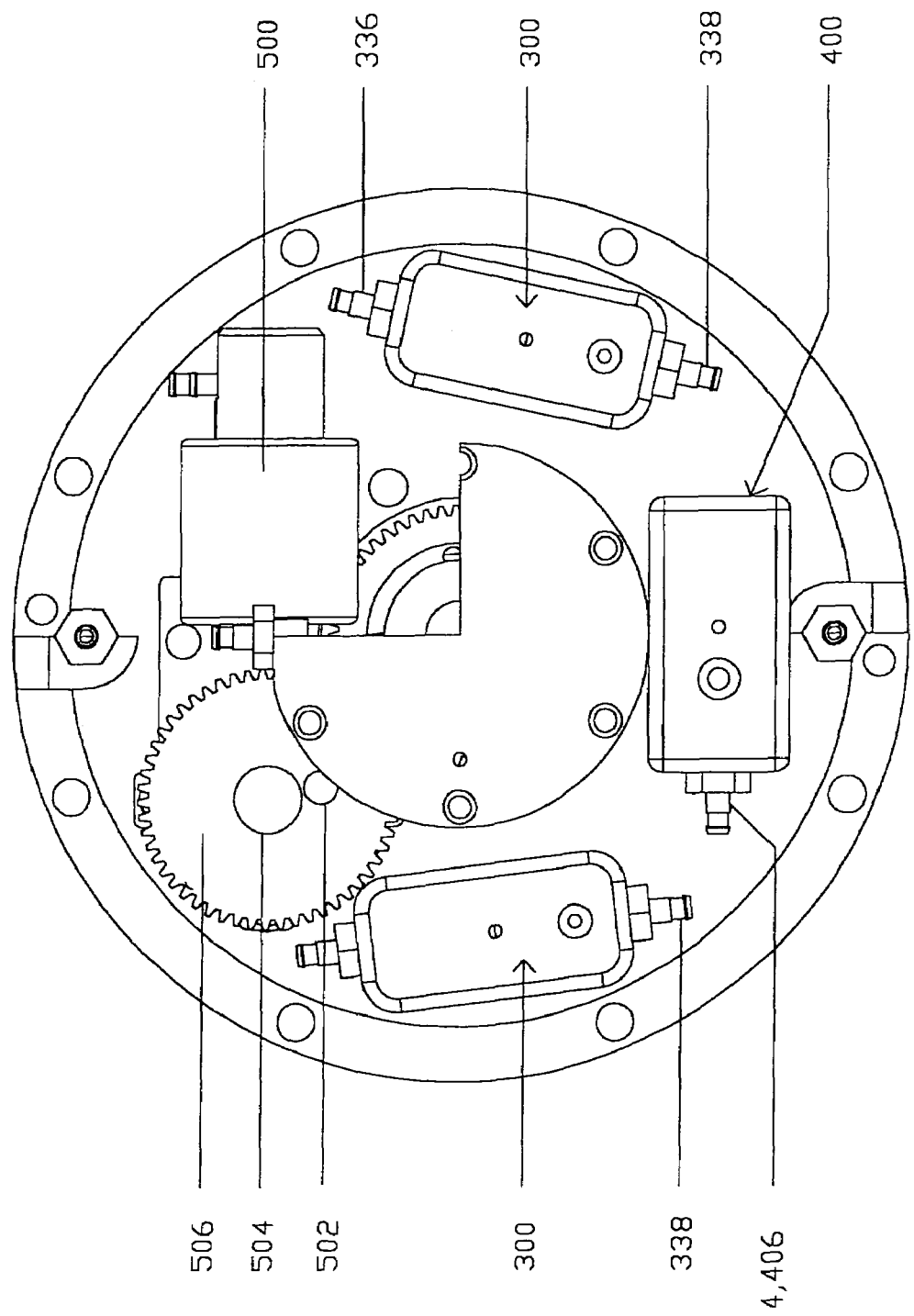
FIG. 46 is an elevation of the device of FIG. 45.
Figure 47:
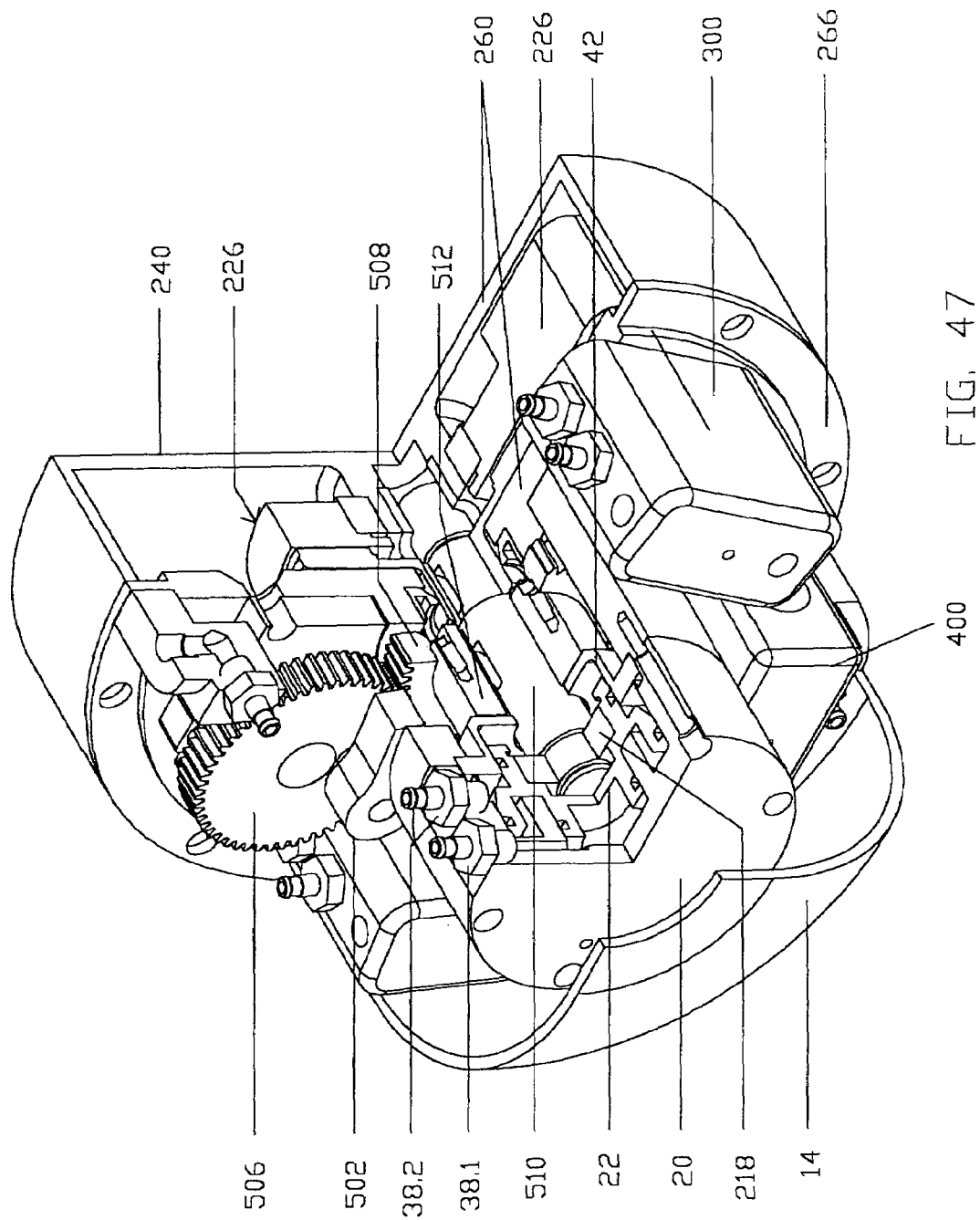
FIG. 47 is a cutaway view of the device of FIGS. 45 and 46.

The units 300 and the sensor 400 are not shown in FIG. 1. The location of these components is best seen in FIGS. 45 to 47.

The device operates as follows. Whilst the pressure in the tyre is above a preset minimum, which can be adjusted by varying the tension of the spring 424, tyre pressure holds the piston 414 in the position shown in FIG. 44. Tyre pressure is thus applied to the chamber C2 via the nipple 406.

Because of the differential nature of the piston 22 it is held at the left hand end of its travel (FIG. 1) by the differential pressure as the force exerted by tyre pressure in chamber C2 exceeds the pressure exerted by tyre pressure in the chamber C1.

When the tyre pressure falls sufficiently, the spring 424 overcomes the restraining force exerted by the pawl 428. The piston 414 then lifts from the position shown in FIG. 44.

The inlet 404 is sealed off from the branch 408 so that air cannot flow from the tyre. The chamber C2 is connected via the inlet 406, the branch 410 and the passage 412 to atmosphere as the seal 418 moves away from the seat 422.

Immediately the chamber C2 is evacuated, pressure in the chamber C1 pushes the differential piston 22 and the shaft 216 to the right. The clutch plate 260 moves to the right with the shaft 216.

The clutch is thus engaged as the clutch plate 260 is pressed against the heavy "hanging" counterweight 226. The mass of the counterweight is such that it stops the clutch plate 260 from rotating. This has the further result that the shaft 216 stops rotating whereas the remainder of the components shown in FIG. 1 continue rotating. Relative rotation between the eccentric 228 and the connecting rod structure 234 causes the connecting rod 235 to reciprocate and pumping of air from the cylinder head 250 commences. This air feeds through the distributor unit 300 via the nipples 326 and 338 to the tyre and it also flows to the inlet 404.

The increase in tyre pressure eventually overcomes the force exerted by the spring 424 and the piston moves back to the position shown in FIG. 44. The pressure in the tyre is thus applied to the chamber C2 via the branch 408 and the inlet 406. The piston 22 moves to the left as the force exerted by the air in the chamber C2 now exceeds the force exerted by the air in the chamber C1. The clutch is disengaged and the shaft 216 and eccentric 228 are now free to rotate with the remainder of the components. Pumping thus ceases.

It will be understood that it is only when air is needed is power absorbed for pumping purposes. At all other times the components, apart from the hanging counterweight, rotate in unison without relative motion.

In the event of a tyre overpressure the ball 317 lifts off its seat and permits flow through the passage 340.

Turning finally to FIGS. 45 to 47 this shows a further embodiment of the pumping device. Where applicable, like reference numerals have been used.

In this form the pump is a reciprocating piston pump and is designated 500. It is driven by a crank 502 from a crankshaft 504 turned by a gear 506. The gear 506 is in mesh with a further gear 508. The gear 508 on a cylindrical shaft 510 which replaces the eccentric shaft 216 and to which the clutch plate 260 is keyed.

The gear 508 does not move axially. It is carried by a cylindrical carrier 512 which is keyed to the shaft 510. This arrangement avoids the necessity of providing gears at least one of which is of double width.

When air is required the differential piston 22 moves and the gear 508 is thus clutched to the non-rotating counterweight and thus stops rotating. The rest of the structure shown in FIGS. 45 to 47 continues rotate and thus the gear 506 is rotated about its axis as it rolls around the periphery of the now static gear 508.

The invention claimed is:

1. A device for inflating a vehicle tire which device comprises
   a pump which in use rotates with the vehicle tire, and
   a pump drive system for activating said pump upon a loss of tire pressure being detected thereby to pump air to the tire, said pump drive system including
   a first part which rotates continuously with said pump,
   a second part which rotates with the pump and said first part whilst the pressure in the tire is above a predetermined level, and
   a clutch which releasably connects the second part to the first part, and
   wherein said second part is inhibited from rotating with said first part whilst the tire pressure is below said predetermined level, and
   wherein relative rotation between said first and second parts drives said pump to pump air to the tire.

2. A device as claimed in claim 1 and including a piston in a housing, the piston and housing bounding two chambers for connection to the tire to be pumped, the chambers being on opposite sides of the piston whereby the piston is subjected on two faces thereof to tire pressure, one face being larger in area than the other, there being means for evacuating the chamber which is bounded by said one face upon tire pressure dropping thereby permitting the piston to move under pressure in the other chamber, movement of the piston inhibiting rotation of said second part.

3. A device as claimed in claim 2, and including a clutch plate which rotates with said second part and a counterweight which does not rotate, said clutch plate being urged against said counterweight when the piston moves upon said one chamber being evacuated thereby to stop rotation of said clutch plate, said clutch plate being fast in rotation with said second part.

4. A device as claimed in claim 3, wherein said second part is a shaft which includes an eccentric and said first part comprises a connecting rod and a plunger, the eccentric reciprocating said rod which in turn reciprocates the plunger in a cylinder to pump air upon rotation of said eccentric being inhibited.

5. A device as claimed in claim 3, and including a sun gear which is fast in rotation with said clutch plate, a planetary gear in mesh with said sun gear, a pump including a cylinder and a plunger, and a crank driven by said planetary gear for reciprocating said plunger in the cylinder when said clutch plate is urged against the counterweight.

6. A device for inflating a vehicle tire whilst the vehicle is travelling, the device comprising an element having a first position which it occupies when the tire pressure is at or above a predetermined level and a second position it occupies when the tire pressure is below said level, means for detecting that tire pressure is below said level and initiating movement of said element to said second position, a pump for pumping said tire, the pump, in use, rotating with the vehicle tire, a pump drive system having first, second and third parts, said first part being a non-rotating part, said second part, in use, rotating continuously and the third part rotating with the second part whilst the tire pressure is above said level, said element urging said third part into cooperating relationship with said first part so that the third part stops rotating upon said element moving to its second condition, consequent relative rotation between said second and third parts causing air to be pumped.

7. A device according to claim 6, wherein said first part is a counterweight the mass of which inhibits it from rotating, said second part is a planetary gear wheel, and said third part includes a sun wheel about which the planetary gear rolls when the sun wheel is prevented from rotating and a clutch plate which is urged into contact with said counterweight upon said element moving to said second position.

* * * * *